(12) United States Patent
Copp et al.

(10) Patent No.: US 6,321,819 B1
(45) Date of Patent: Nov. 27, 2001

(54) RETRACTABLE COVER SYSTEM

(76) Inventors: Heath R. Copp, 917 S. 46th St.; Matthew A. Johnson, 1110 14th Ave. South, Suite 4, both of Grand Forks, ND (US) 58201

(*) Notice: Subject to any disclaimer, the term of this patent is extended or adjusted under 35 U.S.C. 154(b) by 0 days.

(21) Appl. No.: 09/510,686

(22) Filed: Feb. 23, 2000

(51) Int. Cl.[7] ............................................. B60P 7/02
(52) U.S. Cl. ........................... 160/35; 160/36; 296/100.09
(58) Field of Search .................................. 160/35, 36, 37, 160/32, 206, 209; 296/100.09, 100.1, 100.07

(56) References Cited

U.S. PATENT DOCUMENTS

| | | | |
|---|---|---|---|
| 4,210,361 | * | 7/1980 | Marvin et al. ............. 296/100.09 X |
| 4,550,945 | * | 11/1985 | Englehardt ...................... 296/100.09 |
| 4,867,220 | * | 9/1989 | Matsumoto et al. .................... 160/35 |
| 5,344,159 | * | 9/1994 | Powell ............................ 296/100.09 |
| 5,823,605 | * | 10/1998 | Seargeant ........................ 296/100.09 |

* cited by examiner

Primary Examiner—David M. Purol
(74) Attorney, Agent, or Firm—Michael S. Neustel

(57) ABSTRACT

A retractable cover system that folds into a compact storage position which can also be easily removed from the pickup truck box. The inventive device includes a pair of opposing rails attachable to the upper portions of a box of a pickup truck, a front member extending between the pair of rails, a mounting bracket attached to each of the rails for securing the rails within the box, and a cover structure movably positioned between the rails. The cover structure is comprised of a plurality of panels pivotally attached to one another having a set of first rollers and a set of second rollers on opposing sides of the panels that rotatably travel within the rails. A pair of opposing ramp structures are attached to the opposing rails for allowing the set of first rollers to travel downwardly from the rails. The first rollers and the second rollers are preferably staggered with respect to one another upon each side of the panels thereby allowing the second rollers to remain upon the rails while the first rollers travel downwardly and upwardly upon the ramp structures.

20 Claims, 9 Drawing Sheets

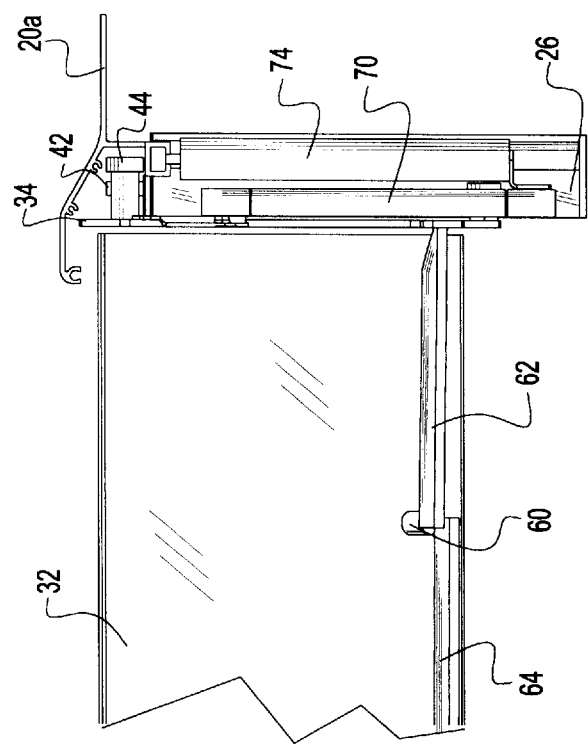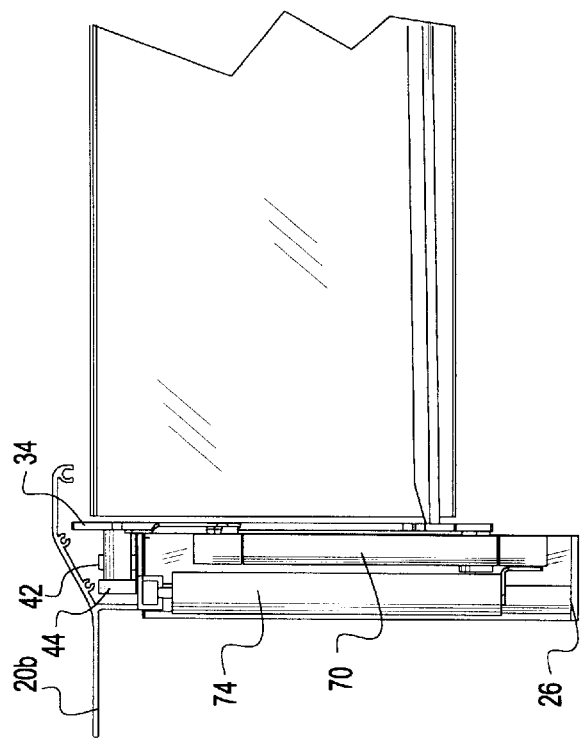
Fig. 5

RETRACTABLE COVER SYSTEM

BACKGROUND OF THE INVENTION

1. Field of the Invention

The present invention relates generally to pickup truck box covers and more specifically it relates to a retractable cover system for a pickup truck box that folds into a compact storage position which can also be easily removed from the pickup truck box.

Individuals that own pickup trucks often times desire to enclose the box portion for increasing the appearance and increasing fuel mileage of the vehicle. Owners of pickup trucks also have items within the box of their vehicle that they desire to have covered so that others cannot easily see the items. Many owners of pickup trucks purchase covers that enclose the box of the pickup truck. However, many of these covers are inconvenient to utilize and do not provide the safety required for the items within the box of the pickup truck. Hence, there is a need for a cover for the box of a pickup truck that is convenient to utilize that also securely protects the contents of the pickup truck box.

2. Description of the Prior Art

Pickup truck box covers have been in use for years. Typically, a conventional cover for a pickup box is comprised of a tarp-like structure that is securable about the upper perimeter of the pickup truck box. Some covers utilize a hook and loop fastener system for securing the tarp-like structure about pickup box cover. Other conventional covers utilize other securing devices such as button snaps.

The main problem with conventional covers for pickup trucks is that they are difficult to partially remove for accessing objects stored within the pickup truck box. Another problem is that conventional covers do not provide a rigid surface capable of supporting heavy objects. Another problem with conventional covers is that they are easily broken into by criminals thereby allowing theft of items within the pickup truck box. A further problem with conventional covers is that they are difficult to remove and place into a compact storage position.

Examples of patented cover devices include U.S. Pat. No. 4,747,441 to Apolzer et al.; U.S. Pat. No. 3,416,835 to Ohle; U.S. Pat. No. 4,946,217 to Steffens et al.; U.S. Pat. No. 4,844,531 to Kooiker; U.S. Pat. No. 6,000,744 to Kooiker; U.S. Pat. No. 5,653,491 to Steffens et al.; U.S. Pat. No. 5,087,093 to Repetti; U.S. Pat. No. 4,210,361 to Marvin et al. which are all illustrative of such prior art.

While these devices may be suitable for the particular purpose to which they address, they are not as suitable for folding into a compact storage position which can also be easily removed from the pickup truck box. Conventional pickup truck box covers do not allow easy and compact storage of the covers as taught by the present invention.

In these respects, the retractable cover system according to the present invention substantially departs from the conventional concepts and designs of the prior art, and in so doing provides an apparatus primarily developed for the purpose of folding into a compact storage position which can also be easily removed from the pickup truck box.

SUMMARY OF THE INVENTION

In view of the foregoing disadvantages inherent in the known types of pickup truck covers now present in the prior art, the present invention provides a new retractable cover system construction wherein the same can be utilized for folding into a compact storage position which can also be easily removed from the pickup truck box.

The general purpose of the present invention, which will be described subsequently in greater detail, is to provide a new retractable cover system that has many of the advantages of the pickup truck covers mentioned heretofore and many novel features that result in a new retractable cover system which is not anticipated, rendered obvious, suggested, or even implied by any of the prior art pickup truck covers, either alone or in any combination thereof.

To attain this, the present invention generally comprises a pair of opposing rails attachable to the upper portions of a box of a pickup truck, a front member extending between the pair of rails, a mounting bracket attached to each of the rails for securing the rails within the box, and a cover structure movably positioned between the rails. The cover structure is comprised of a plurality of panels pivotally attached to one another having a set of first rollers and a set of second rollers on opposing sides of the panels that rotatably travel within the rails. A pair of opposing ramp structures are attached to the opposing rails for allowing the set of first rollers to travel downwardly from the rails. The first rollers and the second rollers are preferably staggered with respect to one another upon each side of the panels thereby allowing the second rollers to remain upon the rails while the first rollers travel downwardly and upwardly upon the ramp structures.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a retractable cover system that will overcome the shortcomings of the prior art devices.

A second object is to provide a retractable cover system for folding into a compact storage position which can also be easily removed from the pickup truck box.

Another object is to provide a retractable cover system that securely protects items within a box of a pickup truck.

An additional object is to provide a retractable cover system that folds into a compact storage position while retained within the box of the pickup truck.

A further object is to provide a retractable cover system that may be utilized upon various types of pickup truck boxes.

Another object is to provide a retractable cover system that provides a rigid protective covering for a pickup truck box.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 5 is a front view of the present invention in the folded position showing the locking mechanism structure.

DESCRIPTION OF THE PREFERRED EMBODIMENT

Figure 1:
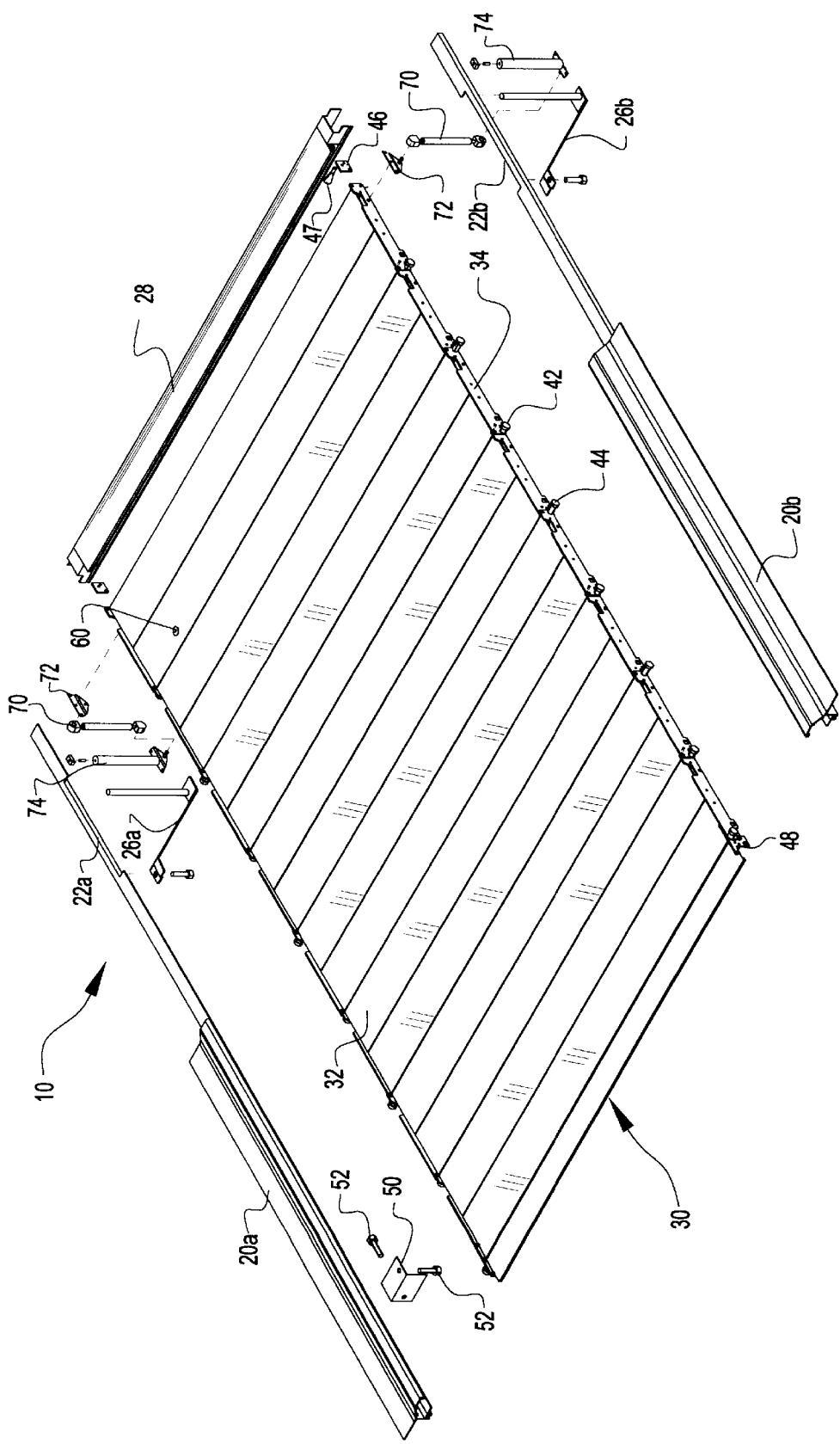
FIG. 1 is an exploded upper perspective view of the present invention.

Turning now descriptively to the drawings, in which similar reference characters denote similar elements throughout the several views, FIGS. 1 through 9 illustrate a retractable cover system 10, which comprises a pair of opposing rails 20a–b attachable to the upper portions of a box 14 of a pickup truck 12, a front member 28 extending between the pair of rails 20a–b, a mounting bracket 50 attached to each of the rails 20a–b for securing the rails 20a–b within the box 14, and a cover structure 30 movably positioned between the rails 20a–b. The cover structure 30 is comprised of a plurality of panels 32 pivotally attached to one another having a set of first rollers 42 and a set of second rollers 44 on opposing sides of the panels 32 that rotatably travel within the rails 20a–b. A pair of opposing ramp structures 26a–b are attached to the opposing rails 20a–b for allowing the set of first rollers 42 to travel downwardly from the rails 20a–b. The first rollers 42 and the second rollers 44 are preferably staggered with respect to one another upon each side of the panels 32 thereby allowing the second rollers 44 to remain upon the rails 20a–b while the first rollers 42 travel downwardly and upwardly upon the ramp structures 26a–b.

As shown in FIGS. 1 through 4 of the drawings, the rails 20a–b are comprised of an elongate structure. The rails 20a–b are preferably conformed to fit within the upper sides of the box 14 of a pickup truck 12 between the cab 16 and the tailgate as further shown in FIGS. 1 through 4 of the drawings. A front member 28 is preferably connected between the rails 20a–b near the cab 16 of the pickup truck 12 as shown in FIGS. 1 through 4 of the drawings. The rails 20a–b may be comprised of any wellknown material and may be constructed with any well-known process.

Figure 4:
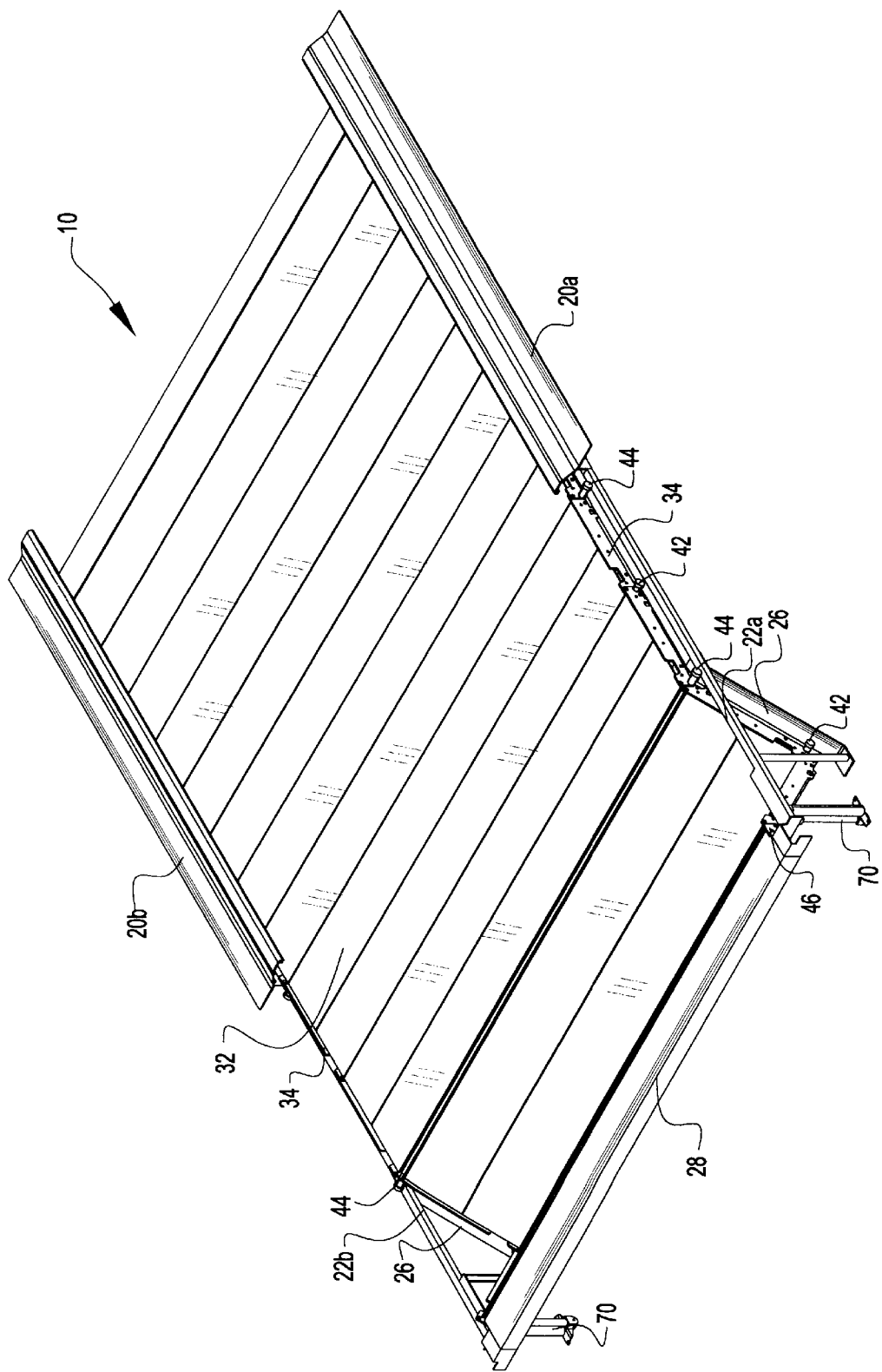
FIG. 4 is a cutaway view of the present invention.

As best shown in FIG. 5 of the drawings, the rails 20a–b have a cross sectional shape that fits about the upper portions of the box 14 of the pickup truck 12. Each of the rails 20a–b have a channel that receives the rollers 42, 44. As best shown in FIGS. 1 and 4 of the drawings, the rails 20a–b include a pair of corresponding cutouts 22a–b positioned near the cab 16 of the pickup truck 12 for allowing the first rollers 42 to pass downwardly to the ramp structures 26a–b. The cutouts 22a–b extend into the rails 20a–b a finite distance from an inner portion as shown in FIG. 4 of the drawings.

As shown in FIG. 1 of the drawings, a mounting bracket 50 is utilized for securing each of the rails 20a–b to the box 14 of the pickup truck 12. A first fastener 52 extends vertically through the mounting bracket 50 and threadably engages the rail 20a–b. The mounting bracket 50 engages the under side of the upper portion of the box 14 thereby preventing vertical movement of the rails 20a–b. A second fastener 52 extends horizontally through the mounting bracket 50 to engage the rear portion of the box 14 thereby preventing longitudinal movement of the rails 20a–b with respect to the box 14.

Figure 2:
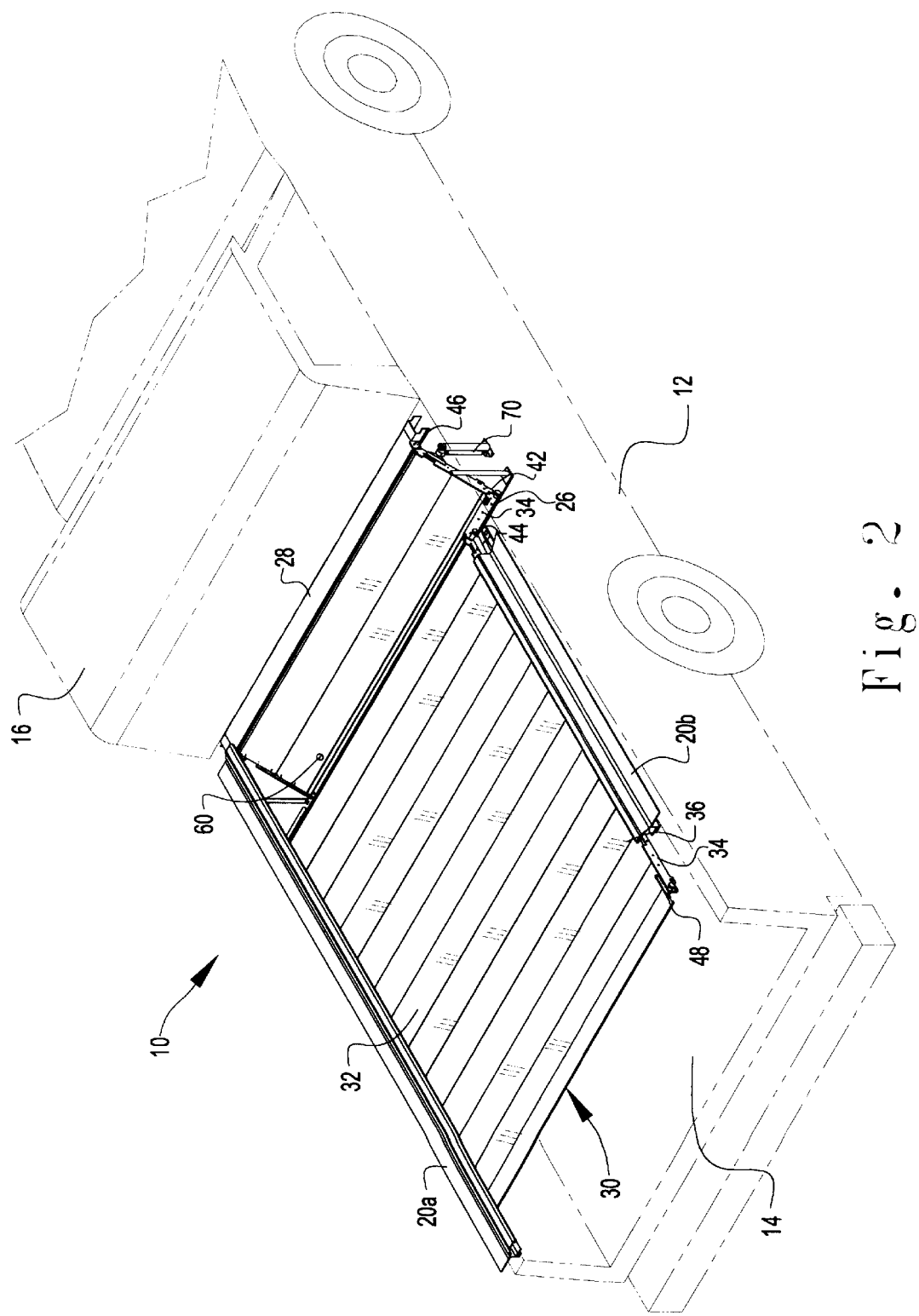
FIG. 2 is an upper perspective view of the present invention attached to a box of a pickup truck in the extended position.
Figure 3:
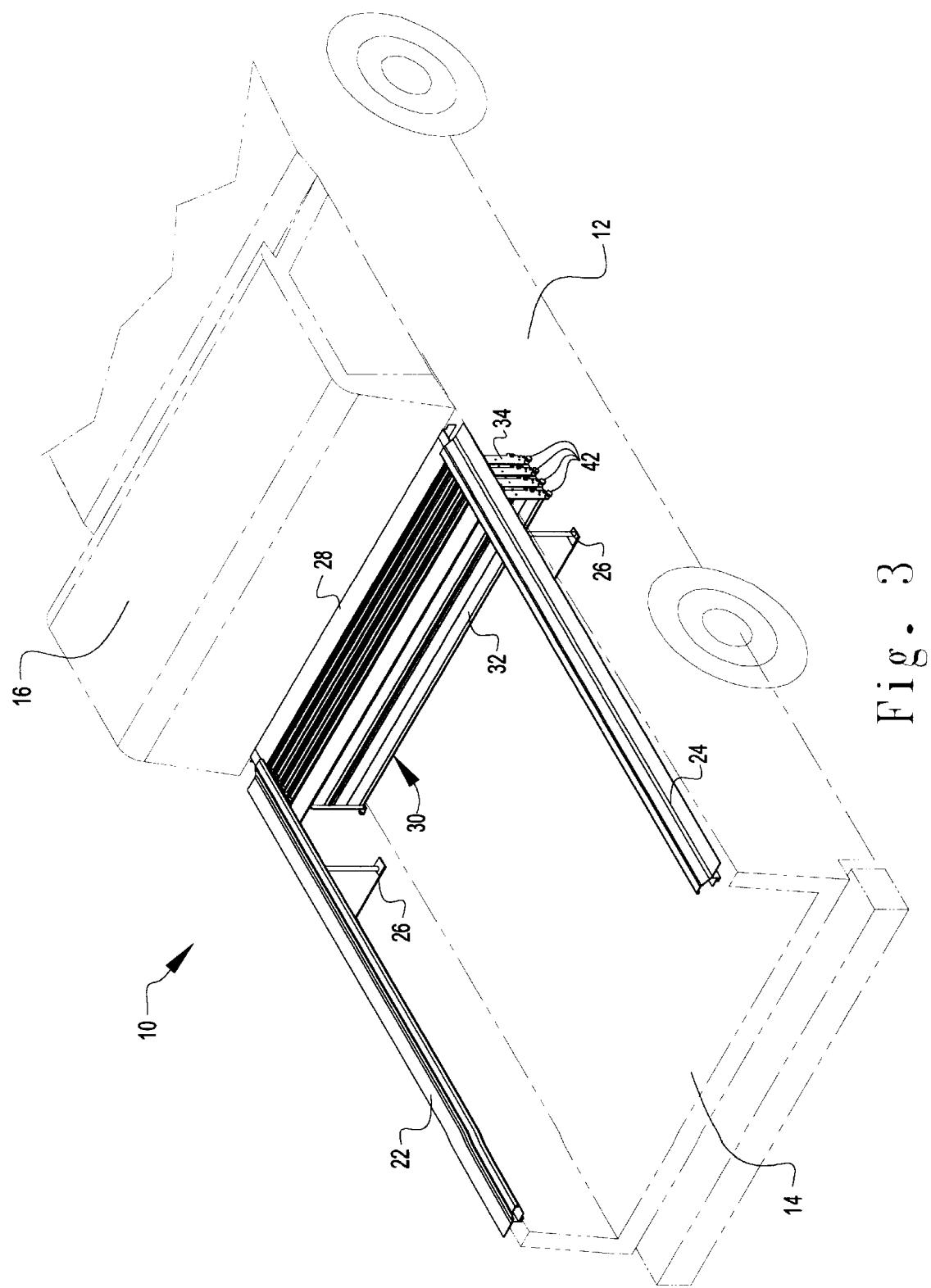
FIG. 3 is an upper perspective view of the present invention attached to a box of a pickup truck in a retracted storage position.

As shown in FIGS. 1, 3 and 4 of the drawings, the cover structure 30 extends between the rails 20a–b to enclose the box 14 of the pickup truck 12. The cover structure 30 is movably supported between the rails 20a–b for allowing extension and retraction of the cover structure 30 along the rails 20a–b. As shown in FIGS. 1 through 9 of the drawings, the cover structure 30 is comprised of a plurality of panels 32 pivotally attached to one another. The cover structure 30 may be comprised of any well known material.

Figure 9:
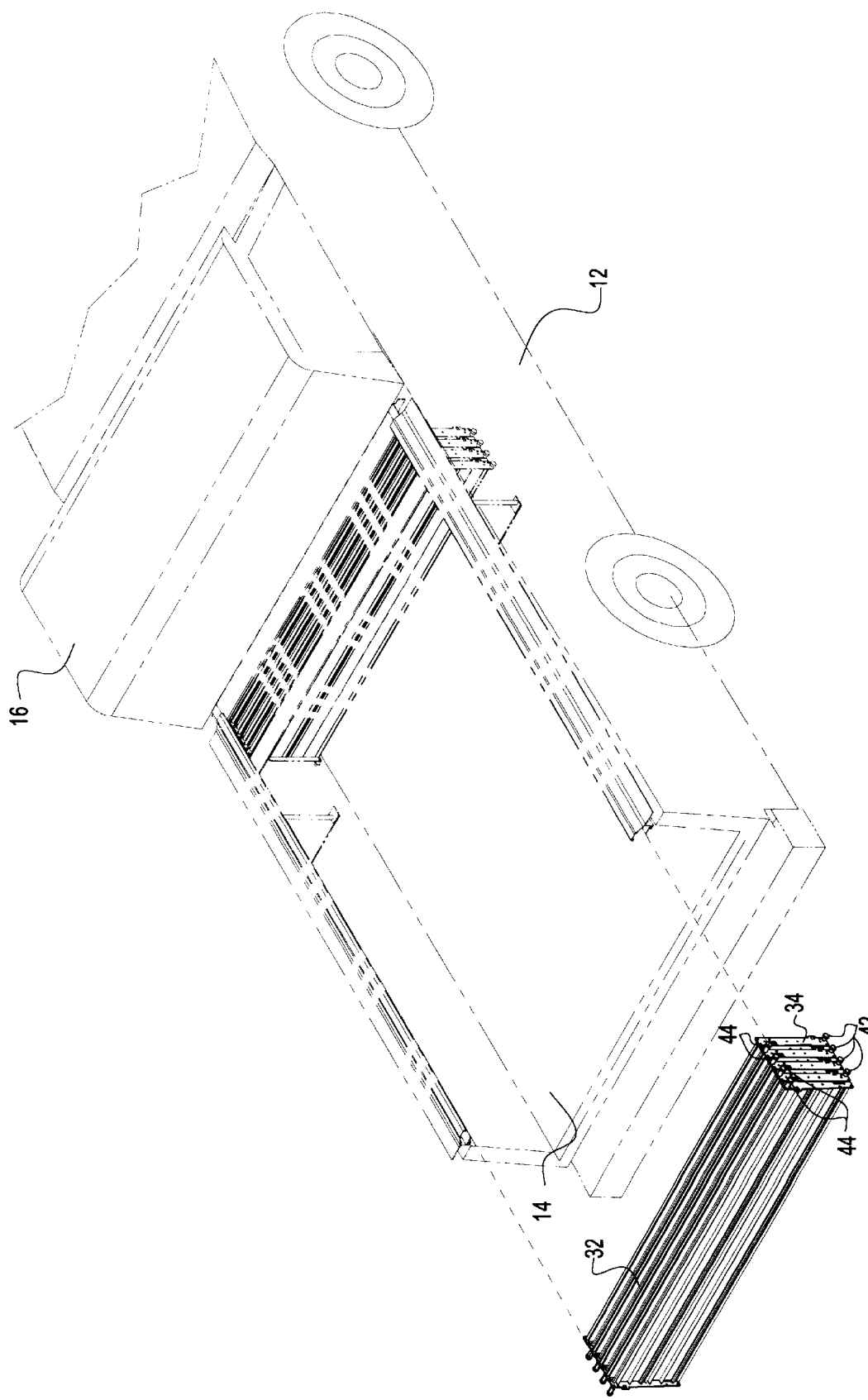
FIG. 9 is an exploded upper perspective view of the present invention wherein the panels are removed from the rails.

As best shown in FIG. 1 of the drawings, a pair of links 46 are attached to the front member 28. As further shown in FIG. 1 of the drawings, a removable connector pin 47 connects the links 46 to the front panel 32 of the cover structure 30. The user removes the connector pin 47 of each of the links 46 to allow removal of the cover structure 30 by sliding the cover structure 30 from the rails 20a–b as shown in FIG. 9 of the drawings. Each of the panels 32 preferably includes a pair of opposing end members 34 that provide additional support to the panels 32 at the distal ends thereof. The panels 32 can be pivotally attached to one another through any wellknown pivot structure.

Figure 6:
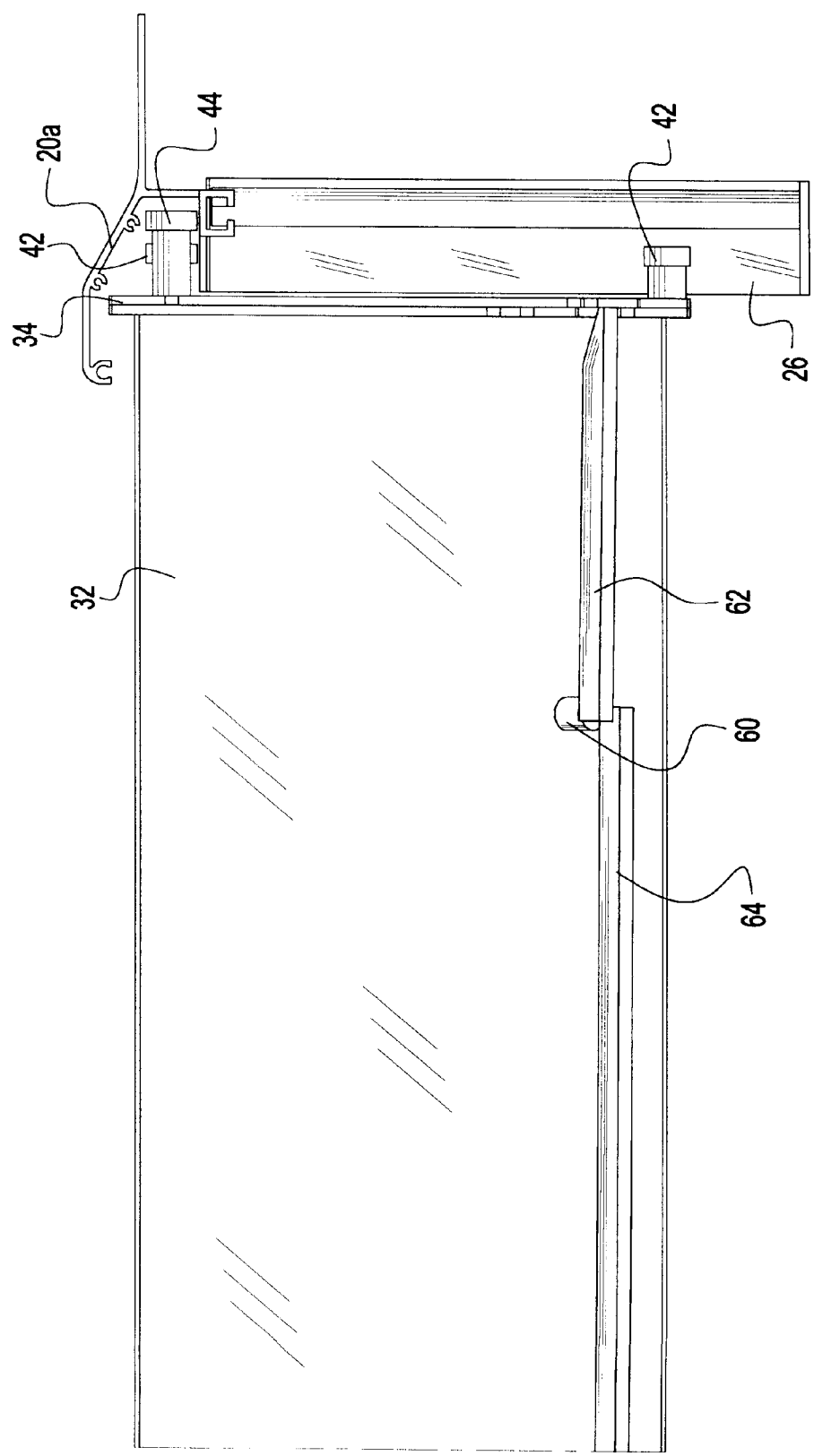
FIG. 6 is a magnified front view of the present invention.
Figure 7:
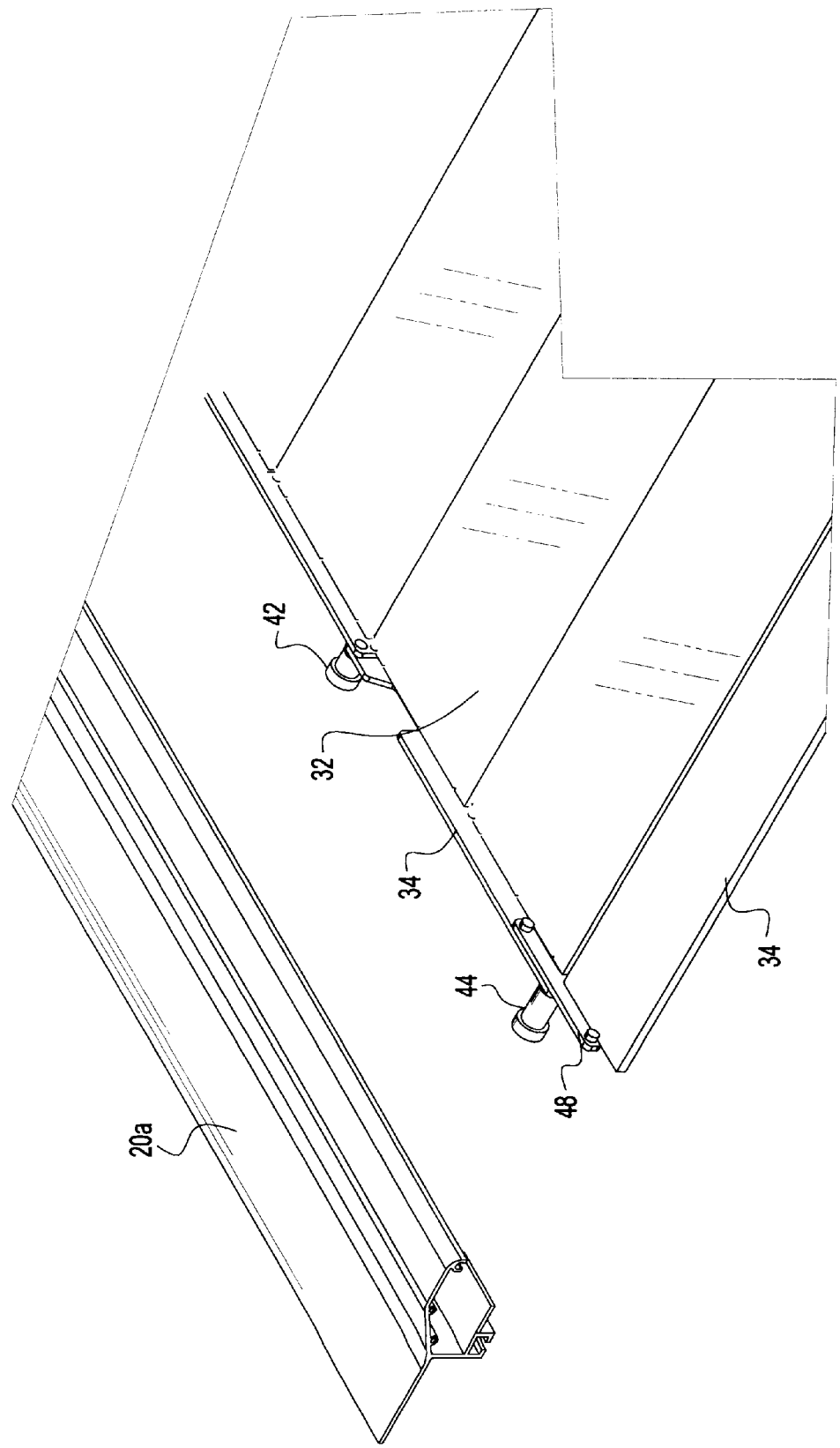
FIG. 7 is a magnified exploded upper perspective view of the present invention.
Figure 8:
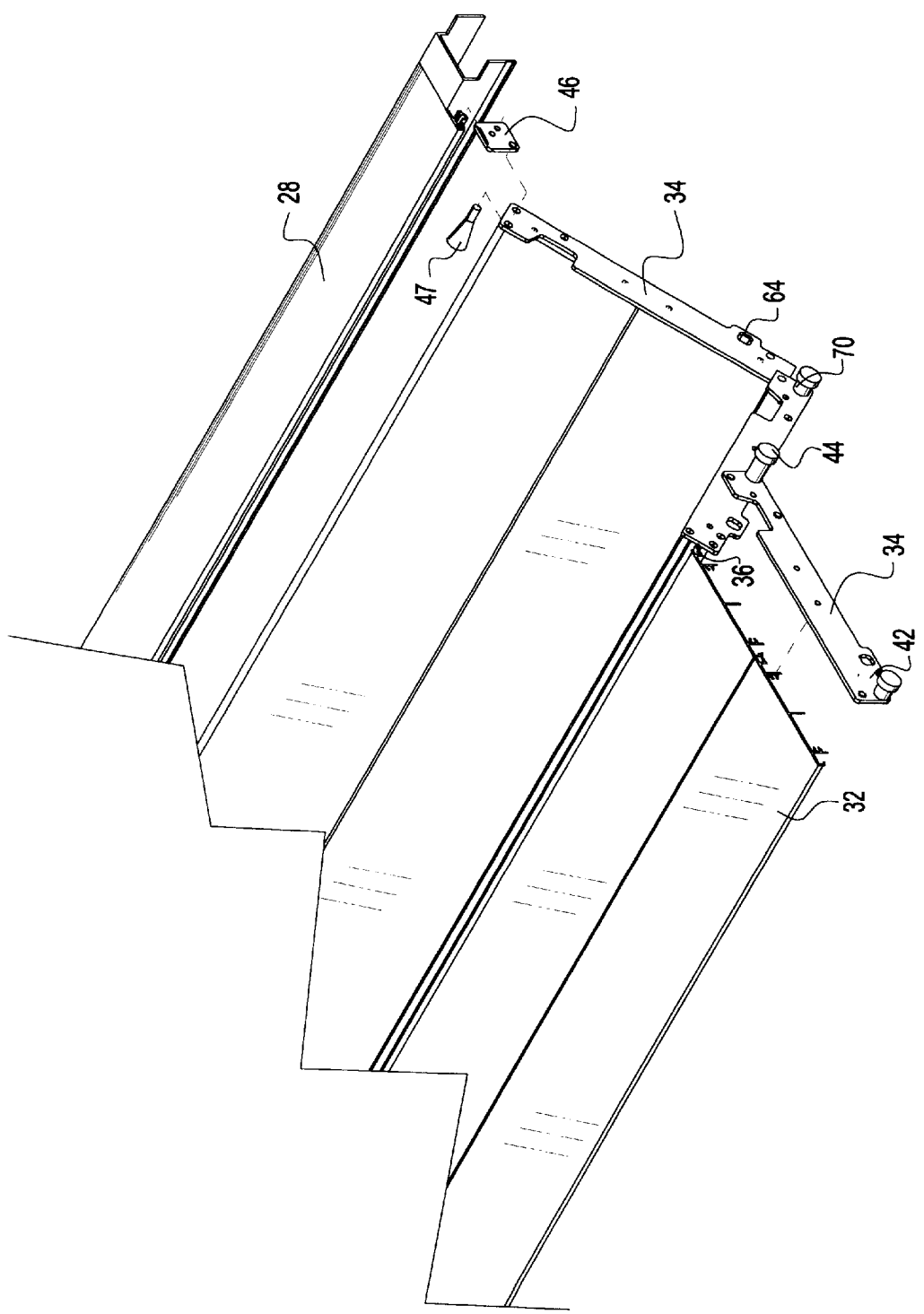
FIG. 8 is an exploded upper perspective view of the present invention showing the panels pivotally connected to one another.

As shown in FIGS. 1 and 3 through 9 of the drawings, a plurality of first rollers 42 and a plurality of second rollers 44 are attached to the opposing ends of the panels 32 for movably supporting the cover structure 30 between the rails 20a–b. As shown in FIGS. 5, 6 and 7 of the drawings, the first rollers 42 are attached to the cover structure 30 by shorter shafts than the shafts supporting the second rollers 44. The first rollers 42 travel upon the exterior portions of the rails 20a–b while the second rollers 44 travel upon the inner portions of the rails 20a–b as shown in FIGS. 5, 6 and 7 of the drawings.

As shown in FIG. 2 of the drawings, the first rollers 42 pass down through the cutouts 22a–b within the rails 20a–b and are there after guided by the ramp structures 26a–b until the panels 32 are substantially vertically orientated. The second rollers 44 are supported upon the rails 20a–b as shown in FIG. 4 of the drawings.

A pair of connecting members 74 extend downwardly from the rails 20a–b as shown in FIG. 1 of the drawings. A pair of corresponding actuators 70 are attached to the connecting members 74 opposite of the rails 20a–b. A pair of connecting brackets 72 connect the actuators 70 to the front panel 32 for providing an upward force upon the front panel 32. The actuator may be comprised of any well-known compression spring or compressed gas structure that is capable of applying an upward force upon the front panel 32.

As shown in FIGS. 2 and 5 of the drawings, a locking mechanism 60 is positioned within the front panel 32. The locking mechanism 60 receives a conventional key for allowing manual manipulation of the locking mechanism 60. A first rod 62 and a second extend from the locking mechanism 60 as shown in FIG. 5 of the drawings and extend through the end members 34. When the rods 62, 64 are fully extended through the end members 34, the rods 62, 64 engage the rails 20a–b thereby preventing the front panel 32 from folding with respect to the adjacent panel 32. It can be appreciated that various other locking structures may be utilized for the present invention.

In use, the cover structure 30 is movably supported within the rails 20a–b. To open the cover structure 30 to expose the box 14 of the pickup truck 12, the user inserts a key into the locking mechanism 60 and then manipulates the locking mechanism 60 to retract the first rod 62 and the second rod 64 from the rails 20a–b. The user then pushes down upon front portion of the cover structure 30 adjacent the cab 16 of the pickup truck 12 thereby causing the front two panels 32 to pivot with respect to one another as shown in FIGS. 2 and 4 of the drawings. The remaining panels 32 are simultaneously moved toward the cab 16 as the front panels 32 are pivoted into a vertical structure. As the panels 32 of the cover structure 30 move forwardly, the first rollers 42 drop through cutouts 22a–b onto the ramp structures 26a–b while the second rollers 44 are allowed to roll along the rails 20a–b outside of the cutouts 22a–b thereby supporting the panels 32 into a vertically orientated structure as shown in FIG. 3 of the drawings. A rear roller 48 upon a rear portion of the cover structure 30 supports the rear portion of the cover structure 30 as shown in FIG. 1 of the drawings. The user then is able to access the contents of the box 14 of the pickup. The user then may either close the cover structure 30 about the box 14 or the user may remove the cover structure 30 from the rails 20a–b. If the user desires to simply close the cover structure 30 about the box 14, the user pulls upon the rear portion of the cover structure 30 thereby pulling the first rollers 42 up the ramp structures 26a–b thereby lifting the panels 32 into a horizontal position. The user continues this process until the cover structure 30 completely encloses the box 14 of the pickup truck 12. The actuators 70 prevent the cover structure 30 from collapsing toward the front of the box 14 by applying an upward pressure upon the front panel 32. If the user desires to remove the cover structure 30 from the rails 20a–b to provide increased storage space within the box 14, the user simply removes the connector pin 47 from the links 46 that support the front panel 32 of the cover structure 30 thereby allowing the user to remove the entire cover structure 30 from the panels 32 as shown in FIG. 9 of the drawings. The user may insert the cover structure 30 back into the rails 20a–b when desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A retractable cover system, comprising:
    a first rail having a first front portion, a first rear portion, and a first cutout within a lower inner portion of said first front portion;
    a second rail having a second front portion, a second rear portion, and a second cutout within a lower inner portion of said second front portion;
    a plurality of panels pivotally attached to one another at a plurality of pivot points, wherein said plurality of panels includes a front panel;
    a plurality of first rollers attached to opposing ends of said plurality of panels adjacent said plurality of pivot points, wherein said plurality of first rollers are alternated upon said plurality of pivot points and said plurality of first rollers pass over said first cutout and said second cutout;
    a plurality of second rollers attached to opposing ends of said plurality of panels adjacent said plurality of pivot points, wherein said plurality of second rollers are staggered with respect to said plurality of first rollers and said plurality of second rollers descend through said cutouts; and
    at least one actuator attached to said front panel of said plurality of panels for applying an upward force upon said front panel thereby maintaining said front panel and an adjacent connected panel in a horizontal state when said plurality of panels are fully extended and substantially parallel to one another upon said rails thereby maintaining said plurality of panels within a substantially horizontal structure.

2. The retractable cover system of claim 1, including a first ramp structure and a second ramp structure attached to said first rail and said second rail respectively adjacent said cutouts for receiving said plurality of second rollers.

3. The retractable cover system of claim 1, wherein said plurality of panels are connected to a front portion of said rails.

4. The retractable cover system of claim 1, including a front member attached between said rails, wherein said front panel is pivotally connected to said front member.

5. The retractable cover system of claim 4, wherein said plurality of panels are removably connected to said front member by a pair of links and a pair of connector pins.

6. The retractable cover system of claim 1, including a locking structure within said plurality of panels.

7. The retractable cover system of claim 6, wherein said locking structure is comprised of a locking mechanism, and a first rod and a second rod attached to said locking mechanism, wherein said first rod and second rod extend into said rails for securing said plurality of panels.

8. The retractable cover system of claim 1, wherein said at least one actuator is comprised of a pressurized gas actuator structure.

9. The retractable cover system of claim 1, wherein said at least one actuator is comprised of a compression spring actuator structure.

10. The retractable cover system of claim 1, wherein said at least one actuator is comprised of a combination gas and compression spring actuator structure.

11. A retractable cover system, comprising:
- a first rail having a first front portion, a first rear portion, and a first cutout within a lower inner portion of said first front portion;
- a second rail having a second front portion, a second rear portion, and a second cutout within a lower inner portion of said second front portion;
- a plurality of panels pivotally attached to one another at a plurality of pivot points, wherein said plurality of panels includes a front panel;
- a plurality of first rollers attached to opposing ends of said plurality of panels adjacent said plurality of pivot points, wherein said plurality of first rollers are alternated upon said plurality of pivot points and said plurality of first rollers have a shaft providing sufficient length to pass about said first cutout and said second cutout; and
- a plurality of second rollers attached to opposing ends of said plurality of panels adjacent said plurality of pivot points, wherein said plurality of second rollers are staggered with respect to said plurality of first rollers and said plurality of second rollers have a shorter shaft than said plurality of first rollers thereby allowing said second rollers to descend through said cutouts.

12. The retractable cover system of claim 11, including a first ramp structure and a second ramp structure attached to said first rail and said second rail respectively adjacent said cutouts for receiving said plurality of second rollers.

13. The retractable cover system of claim 11, wherein said plurality of panels are connected to a front portion of said rails.

14. The retractable cover system of claim 11, including a front member attached between said rails, wherein said front panel is pivotally connected to said front member.

15. The retractable cover system of claim 14, wherein said plurality of panels are removably connected to said front member by a pair of links and a pair of connector pins.

16. The retractable cover system of claim 11, including a locking structure within said plurality of panels.

17. The retractable cover system of claim 16, wherein said locking structure is comprised of a locking mechanism, and a first rod and a second rod attached to said locking mechanism, wherein said first rod and second rod extend into said rails for securing said plurality of panels.

18. The retractable cover system of claim 11, wherein said plurality of first rollers have a width and a diameter equal to said plurality of second rollers.

19. The retractable cover system of claim 11, wherein said plurality of first rollers have a width equal to said plurality of second rollers.

20. The retractable cover system of claim 11, wherein said plurality of first rollers have a diameter equal to said plurality of second rollers.

* * * * *